United States Patent Office 2,838,551
Patented June 10, 1958

2,838,551

POLYMERIZED FATTY OILS AND METHOD OF PREPARING SAME

Max Kantor and Samuel Guy Wilson, Minneapolis, Minn., assignors to Cargill, Incorporated, Minneapolis, Minn., a corporation of Delaware No Drawing. Application February 9, 1953
Serial No. 336,008

2 Claims. (Cl. 260—407)

This invention relates to improvements in a process and the product resulting from polymerizing unsaturated fatty oils with the aid of an active catalyst. In particular it is related to a method of polymerizing drying and semi-drying oils at relatively moderate temperatures to produce a final product which is relatively light in color, is of stable viscosity, possesses non-penetrating characteristics, has a high mineral spirits tolerance, and is compatible with odorless mineral spirits and other substances used in protective coatings. The product is produced from unsaturated fatty oils which have been previously blown with air or an oxygen containing gas to form oxygen addition products at the double bonds of the fatty substance and the products so treated are catalytically polymerized with an active acid catalyst of a class which is capable of dissociating into hydrogen ions.

In the past it has been a general practice to increase the viscosity of drying and semi-drying oils by blowing a body of oil with air at elevated temperatures. The disadvantage of this practice is that the final product is relatively dark in color and is of uncertain characteristics because generally speaking, oxidation at elevated temperatures causes the polymerization to take effect in different ways, frequently joining the molecules by a carbon to carbon linkage. Oils which have been air blown at moderately elevated temperatures have a limited mineral spirits tolerance as well as limited drying qualities and their non-penetrating qualities are poor. If the temperature is increased a higher mineral spirits tolerance is obtained, but the oils have different working properties, which are equally undesirable. It is well known that unsaturated oils may be polymerized with certain other active catalysts, but frequently such catalysts enter into the reaction and constitute a part of the final product so that the product is subject to further change, or possible reaction with active pigments and might change the color or condition of the coating substance.

One major distinction of the product forming the present invention is in its compatibility with other materials used in coatings, as well as odorless mineral solvents. The normal mineral spirits which have been used heretofore have been objectionable for use with interior paints because of the irritating odor of certain aromatic components of the solvent. Odorless solvents can be made by removing the aromatic components, but when this is done the solvency power is materially reduced, and insofar as we are aware, the present product is the only oxidized polymerized oil which is sufficiently soluble in odorless mineral spirits to be used for coating substances.

Another important distinction is the compatibility of the present product with heat polymerized oils and synthetic resins. In some paint products it is desirable to have a blend of products in the vehicle. While it has been possible heretofore to blend products while warm, on standing such products become cloudy and eventually separate. This is troublesome in that it causes an undue settling and separation of the heavier components of the coating. Because the product of the present invention has characteristics similar to partial thermally polymerized oils as well as oils which have been polymerized with oxygen, it is more readily compatible with such products as certain synthetic resins.

A further distinction in the present invention is in its application to the semi-drying oils such as soya bean oil. Normally this oil and its polymerization products are slow in drying, hence its use in normal products is greatly restricted. The soya bean oil polymerization product resulting from our process assumes a much faster drying rate approximating that of linseed oil, thereby greatly widening the use of this oil in paints and other similar coatings.

In the present invention we have found that when unsaturated fatty oils have been partially blown with air or an oxygen containing gas at temperatures not exceeding substantially 300° F., oxygen is added to the molecules of the oil at the double bonds in the form of oxy, peroxy or hydroxy groups. When oils thus prepared are further treated by the addition of a relatively small amount of an acid of the class which dissociates into hydrogen ions, there is a rapid increase in viscosity as well as mineral spirit tolerance without substantial increase in color or other undesirable characteristics. The change is occasioned by the fact that molecules are linked one to another at the points where the oxygen addition products exist, thereby liberating the catalyst so that the latter does not remain in the final product. An important feature of the present invention is that polymerization occurs at relatively low temperatures, thus avoiding the formation of harmful residues.

The active catalyst which we have found to be most suitable is sulfuric acid, this material is relatively inexpensive and readily dissociates hydrogen ions.

Our concept of the most desirable method of conducting the process is to first partially oxidize the oil at the double bonds such as by blowing with air at temperatures ranging between 70–300° F. until the iodine value is substantially reduced. In the case of refined linseed oil, the iodine value is reduced 20–100 units, and in the case of refined soya bean oil the iodine value is reduced 10–60 units. The polymerization is effected by adding the acid in relatively small catalytic amounts, in the range of 0.2% to 0.5% of the weight of the oil, in dilute form. It is essential that the temperature should not exceed the range of substantially 70–160° F. and in no instance beyond 200° F., for if the temperature is permitted to rise beyond that limit other reactions will occur, including the charring of the oil. The mixture of blown oil and acid catalyst is agitated in any well known manner until the desired viscosity is obtained, whereafter the reaction is terminated by the addition of a sufficient amount of a neutralizing agent to partially neutralize the free acid present in the mixture. Although substantially any form of alkali may be used, to avoid the cloudiness caused by water solutions, a non-aqueous alkali such as triethanolamine is preferred. The actual amount of neutralizing agent may be less than the stoichiometrical amount as it is only necessary to partially neutralize the free acid.

In carrying out the polymerization it is desirable that some mineral spirits be previously added to the blown oil as this materially reduces the viscosity of the oil and permits the reaction to occur with greater ease and avoids the possibility of charring. Preferably the acid is added in several small increments in dilute form.

We believe that the mechanism of the reaction is as shown below although it is to be understood that the structures of the oxy groups and the polymer are not necessarily as represented.

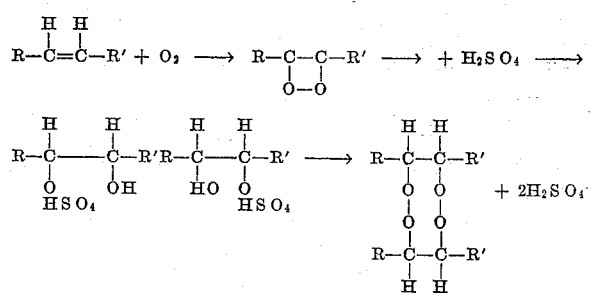

in which R and R' are extensions of the fatty acid molecules.

After neutralizing, the final product is maintained at a temperature of 115–130° F. for a period of twelve to sixteen hours to "cure" the product and obtain a stable viscosity by assuring a complete neutralization of the free acid used in bodying the oil.

*Example 1*

Linseed oil was blown with air at a temperature of 280° F. until the iodine value was reduced to 130. The blown oil was admixed with 30% mineral spirit and the mixture agitated and maintained at 140° F. while 0.4% $H_2SO_4$ in dilute form (1–1) was added in four increments. When the viscosity had reached the desired number, the reaction was neutralized and the product "cured" by being maintained at 120° F. for sixteen hours. Test results follow:

| Time, min. | Vis. (Gardner-Holt), poises | Color (Gardner) | Misc. in M. S. |
|---|---|---|---|
| 0 | 1.25 | 6–7 | 5–1 |
| 30 | 2.25 | 7 | 7–1 |
| 60 | 3.2 | 8 | 8–1 |
| 90 | 4.8 | 8 | 10–1 |
| 120 | 10.7 | 8–9 | 11–1 |
| 150 | 15.0 | 8–9 | 12–1 |
| 195 | 33.0 | 10 | 12–1 |
| | Add .5% Triethanolamine 32.0 | 10 | 12–1 |

*Example 2*

Soya bean oil was blown with air at a temperature of 280° F. until its iodine value was reduced to 80. The blown oil was admixed with 30% of mineral spirit and polymerized under the same conditions as Example 1 using 0.5% sulphuric acid in dilute form. The results of the test were:

| Time, min. | Vis. | Color | Misc. in M. S. |
|---|---|---|---|
| 0 | 2.1 | 5–6 | 6–1 |
| 30 | 3.0 | 6 | 8–1 |
| 60 | 4.3 | 6 | 11–1 |
| 90 | 5.7 | 6–7 | 14–1 |
| 120 | 10.7 | 7 | 20–1 |
| 150 | 13.0 | 7 | 23–1 |
| 170 | 36.0 | 8–9 | 23–1 |
| | Add .75% triethanolamine 32.0 | 8–9 | 23–1 |

Typical analyses of linseed and soya bean oil after air blowing, acid treatment, and with 30% mineral spirits are:

LINSEED

| | Blown Base Oil | Acid Treated Oil @ 100% Solids | Acid Treated Oil @ 70% Solids |
|---|---|---|---|
| Acid Number | 5.0 | 8.0 | 5.6 |
| Color | 7–8 | 8–9 | 8 |
| Viscosity (poises) | 28 | 510 | 19 |
| M/S Tolerance (Volume) | 4–1 | 12–1 | 10–1 |

SOYA

| | Blown Base Oil | Acid Treated Oil @ 100% Solids | Acid Treated Oil @ 70% Solids |
|---|---|---|---|
| Acid Number | 6.8 | 13.0 | 9.1 |
| Color | 6 | 10 | 9–10 |
| Viscosity (poises) | 25 | 575 | 17.6 |
| M/S Tolerance (Volume) | 8–1 | 32–1 | 23–1 |
| | | | (Sometimes infinite miscibility with M/S) |

The final product consists of a polymer which is light in color, and its undiluted form has a viscosity in excess of 500 poises, which is readily miscible in mineral spirits. The product is free of all traces of the catalyst, is quick drying and will not substantially penetrate into the surface to which it has been applied.

In the past it has been the practice to use as a vehicle for the polymerized oil, mineral spirits which contain aromatic components. These components aid materially in the solvency characteristics of the mineral spirits, but they are objectionable in that they are highly irritable to the olfactory nerves and are, therefore, not desirable when used in connection with coatings intended for interior use. There is currently a large demand for paint oils and vehicles which can be used with odorless solvents for interior paints and varnish to avoid the objectionable and irritating odors of present type products. While odorless mineral spirits are known, they could not be used because of their low solvency characteristics with polymerized products, since the odorless mineral spirits have limited compatibility with polymerized products heretofore commercially available. The essential characteristics of these two types of mineral spirits are:

| M. S. | Approx. Boiling Range, °F. | Kauri Butanol Val. |
|---|---|---|
| regular | 325–400 | 34–40 |
| odorless | 300–460 | 24–28 |

In the instance of regular mineral spirits, as set forth above, the product of our invention has a minimum tolerance of about 10 to 1, which is about equal to the best forms of competitive products. When odorless mineral spirits of the type set forth heretofore are used, it has been found that they have limited compatibility with other products, but the product of the present invention combines to form a solution with approximately three or more parts of the odorless mineral spirit, which makes the product of the present invention highly desirable for use with interior paints and coatings.

In summary, our invention demonstrates a new and useful process whereby unsaturated fatty oils are activated through treatment with air or oxygen under closely controlled conditions for subsequent catalytic polymerization to produce products having unusual features. Because the product is made at relatively low temperatures, complex by-products are omitted, wherefore the product is compatible with low solvency odorless mineral spirits. Also, because the final product is to a degree relatively similar to thermally polymerized oils and also oils which have been blown with air, it is miscible with relatively high proportions of either of these products and can act to combine several different types of products.

The invention is not limited to any particular type of fatty oil, since it is believed to be applicable to any form

We claim:

1. A process of treating an unsaturated fatty oil to form polymers which consists of blowing said oil to add oxygen to the unsaturated bonds at a temperature between 70° F. and 300° F., forming a mixture of said blown oil and substantially 0.2% to 0.5% sulfuric acid, maintaining the mixture at a temperature between 70° F. and 160° F. until a substantial portion of the mixture is polymerized and thereafter adding to the mixture a sufficient amount of an alkaline neutralizing agent to partially neutralize the sulfuric acid.

2. A polymer formed of an unsaturated fatty oil blown at a temperature between 70° F. and 300° F. until oxygen has been added to the unsaturated bonds thereof, said blow material then treated at a temperature between room temperature and about 200° F. with a catalytic amount of an aqueous sulfuric acid solution, and thereafter the acid catalyst is at least partially neutralized.

References Cited in the file of this patent

UNITED STATES PATENTS

| | | |
|---|---|---|
| 2,298,916 | Auer | Oct. 13, 1942 |
| 2,383,601 | Keim | Aug. 28, 1945 |
| 2,717,882 | Kiebler et al. | Sept. 13, 1955 |

OTHER REFERENCES

Bailey: "Industrial Oil and Fat Products," 2nd edition, 1951, pp. 902 to 904.